(12) United States Patent
Newton

(10) Patent No.: US 7,629,967 B2
(45) Date of Patent: Dec. 8, 2009

(54) TOUCH SCREEN SIGNAL PROCESSING

(75) Inventor: John David Newton, Auckland (NZ)

(73) Assignee: Next Holdings Limited, Auckland (NZ)

( * ) Notice: Subject to any disclaimer, the term of this patent is extended or adjusted under 35 U.S.C. 154(b) by 765 days.

(21) Appl. No.: 11/033,183

(22) Filed: Jan. 11, 2005

(65) Prior Publication Data

US 2005/0190162 A1  Sep. 1, 2005

Related U.S. Application Data

(63) Continuation of application No. PCT/NZ2004/00029, filed on Feb. 16, 2004.

(30) Foreign Application Priority Data

Feb. 14, 2003 (NZ) ..................................... 524211

(51) Int. Cl.
  *G09G 5/00* (2006.01)
(52) U.S. Cl. ...................... 345/173; 345/156; 345/157; 345/158
(58) Field of Classification Search ................. 345/173, 345/156–158
  See application file for complete search history.

(56) References Cited

U.S. PATENT DOCUMENTS

| 4,553,842 A | 11/1985 | Griffin |
| 4,710,760 A | 12/1987 | Kasday |
| 4,782,328 A | 11/1988 | Denlinger |
| 4,811,004 A | 3/1989 | Person |
| 4,868,551 A | 9/1989 | Arditty et al. |
| 4,893,120 A * | 1/1990 | Doering et al. ............... 341/31 |
| 4,990,901 A | 2/1991 | Beiswenger |
| 5,317,140 A | 5/1994 | Dunthorn |
| 5,525,764 A | 6/1996 | Junkins |
| 6,020,878 A * | 2/2000 | Robinson .................... 345/173 |
| 6,061,177 A | 5/2000 | Fujimoto |

(Continued)

FOREIGN PATENT DOCUMENTS

CA    2350152    6/2001

(Continued)

OTHER PUBLICATIONS

White Paper, Digital Vision Touch Technology, Feb. 2003, Smart Technologies Inc.

(Continued)

*Primary Examiner*—Richard Hjerpe
*Assistant Examiner*—Leonid Shapiro
(74) *Attorney, Agent, or Firm*—Kilpatrick Stockton LLP

(57) ABSTRACT

A touch screen which uses light sources at one or more edges of the screen which directs light across the surface of the screen and at least two cameras having electronic outputs located at the periphery of the screen to receive light from said light sources. A processor receives the outputs of said cameras and employs triangulation techniques to determine the location of an object proximate to said screen. Detecting the presence of an object includes detecting at the cameras the presence or absence of direct light due to the object, using a screen surface as a mirror and detecting at the cameras the presence or absence of reflected light due to an object. The light sources may be modulated to provide a frequency band in the output of the cameras.

21 Claims, 10 Drawing Sheets

U.S. PATENT DOCUMENTS

| | | |
|---|---|---|
| 6,335,724 B1 | 1/2002 | Takekawa et al. |
| 6,352,351 B1 | 3/2002 | Ogasahara et al. |
| 6,504,532 B1 | 1/2003 | Ogasahara et al. |
| 6,532,006 B1 | 3/2003 | Takekawa et al. |
| 6,760,009 B2 * | 7/2004 | Omura et al. ............... 345/157 |
| 6,803,906 B1 | 10/2004 | Morrison et al. |
| 6,927,384 B2 | 8/2005 | Reime et al. |
| 2001/0026268 A1 | 10/2001 | Ito |
| 2001/0050677 A1 | 12/2001 | Tosaya |
| 2002/0008692 A1 | 1/2002 | Omura et al. |
| 2002/0041327 A1 | 4/2002 | Hildreth et al. |
| 2002/0064382 A1 | 5/2002 | Hildreth et al. |
| 2003/0001825 A1 | 1/2003 | Omura et al. |
| 2003/0043116 A1 | 3/2003 | Morrison et al. |
| 2005/0243070 A1 | 11/2005 | Ung et al. |
| 2008/0150913 A1 * | 6/2008 | Bell et al. ................... 345/175 |

FOREIGN PATENT DOCUMENTS

| | | |
|---|---|---|
| EP | 0897161 | 2/1999 |
| JP | 11-212692 | 8/1999 |
| WO | WO 01/91043 | 11/2001 |
| WO | WO 02/03316 | 1/2002 |

OTHER PUBLICATIONS

International Preliminary Report on Patentability, PCT/NZ2004/000029, May 20, 2005, pp. 1-4.

International Search Report, PCT/NZ05/00092, Sep. 27, 2006, pp. 1-3.

* cited by examiner

TOUCH SCREEN SIGNAL PROCESSING

This application is a continuation of co-pending Application No. PCT NZ2004/000029, published as WO 2004/072843, filed Feb. 16, 2004, which claims priority to NZ Application No. 524211, filed Feb. 14, 2003.

TECHINICAL FIELD

The present invention relates to a touch sensitive screen and in particular to optically detecting the presence of an object by using signal processing.

BACKGROUND PRIOR ART

Touch screens of the prior art can take on five main forms. These five forms of touch screen input device include resistive, capacitive, surface acoustic wave (SAW), infrared (IR), and optical. Each of these types of touch screen has its own features, advantages and disadvantages.

Resistive is the most common type of touch screen technology. It is a low-cost solution found in many touch screen applications, including hand-held computers, PDA's, consumer electronics, and point-of-sale-applications. A resistive touch screen uses a controller and a specifically coated glass overlay on the display face to produce the touch connection. The primary types of resistive overlays are 4-wire, 5-wire, and 8 wires. The 5-wire and 8-wire technologies are more expensive to manufacture and calibrate, while 4-wire provides lower image clarity. Two options are generally given: polished or anti-glare. Polished offers clarity of image, but generally introduces glare. Anti-glare will minimize glare, but will also further diffuse the light thereby reducing the clarity. One benefit of using a resistive display is that it can be accessed with a finger (gloved or not), pen, stylus, or a hard object. However, resistive displays are less effective in public environments due to the degradation in image clarity caused by the layers of resistive film, and its susceptibility to scratching. Despite the trade-offs, the resistive screen is the most popular technology because of its relatively low price (at smaller screen sizes), and ability to use a range of input means (fingers, gloves, hard and soft stylus).

Capacitive touch screens are all glass and designed for use in ATM's and similar kiosk type applications. A small current of electricity runs across the screen with circuits located at the corners of the screen to measure the capacitance of a person touching the overlay. Touching the screen interrupts the current and activates the software operating the kiosk. Because the glass and bezel that mounts it to the monitor can be sealed, the touch screen is both durable and resistant to water, dirt and dust. This makes it commonly used in harsher environments like gaming, vending retail displays, public kiosks and industrial applications. However, the capacitive touch screen is only activated by the touch of a human finger and a gloved finger, pen, stylus or hard object will not work. Hence, it is inappropriate for use in many applications, including medical and food preparation.

Surface acoustic wave (SAW) technology provides better image clarity because it uses pure glass construction. A SAW touch screen uses a glass display overlay. Sound waves are transmitted across the surface of the display. Each wave is spread across the screen by bouncing off reflector arrays along the edges of the overlay. Two receivers detect the waves. When the user touches the glass surface, the user's finger absorbs some of the energy of the acoustic wave and the controller circuitry measures the touch location. SAW touch screen technology is used in ATM's, Amusements Parks, Banking and Financial Applications and kiosks. The technology is not able to be gasket sealed, and hence is not suitable to many industrial or commercial applications. Compared to resistive and capacitive technologies, it provides superior image clarity, resolution, and higher light transmission.

Infrared technology relies on the interruption of an infrared light grid in front of the display screen. The touch frame or opto-matrix frame contains a row of infrared LEDs and photo transistors; each mounted on two opposite sides to create a grid of invisible infrared light. The frame assembly is comprised of printed wiring boards on which the opto-electronics are mounted and is concealed behind an infrared-transparent bezel. The bezel shields the opto-electronics from the operating environment while allowing the infrared beams to pass through. The infrared controller sequentially pulses the LEDs to create a grid of infrared light beams. When a stylus, such as a finger, enters the grid, it obstructs the beams. One or more phototransistors detect the absence of light and transmit a signal that identifies the x and y coordinates. Infrared touch screens are often used in manufacturing and medical applications because they can be completely sealed and operated using any number of hard or soft objects. The major issue with infrared is the "seating" of the touch frame is slightly above the screen. Consequently, it is susceptible to "early activation" before the finger or stylus has actually touched the screen. The cost to manufacture the infrared bezel is also quite high.

Optical imaging for touch screens uses a combination of line-scan cameras, digital signal processing, front or back illumination and algorithms to determine a point of touch. The imaging lenses image the user's finger, stylus or object by scanning along the surface of the display. This type of touch screen is susceptible to false readings due to moving shadows and bright lights and also requires that the screen be touched before a reading is taken. Attempts have been made to overcome these disadvantages. Touch screens using optical imaging technology are disclosed in the following publications.

A touch screen using digital ambient light sampling is disclosed in U.S. Pat. No. 4,943,806, in particular this patent discloses a touch input device that continuously samples and stores ambient light readings and compares these with previously taken readings. This is done to minimise the effect of bright light and shadows.

A touch screen for use with a computer system is disclosed in U.S. Pat. No. 5,914,709. In particular a user input device sensitive to touch is disclosed that uses threshold adjustment processing. A light intensity value is read and an "ON" threshold is established, this threshold measurement and adjustment is frequently and periodically performed.

This U.S. Pat. No. 5,317,140 patent discloses a method for optically determining the position and direction of an object on a touch screen display. In particular, a diffuser is positioned over the light sources to produce an average light intensity over the touch screen.

U.S. Pat. No. 5,698,845 discloses a touch screen display that uses an optical detection apparatus to modulate the ON/OFF frequency of light emitters at a frequency of twice the commercial AC line source. The receiver determines the presence of light and compares this to the actual signal transmitted.

U.S. Pat. No. 4,782,328 discloses a touch screen that uses a photosensor unit positioned at a predetermined height above the touch screen, and when a pointer nears the touch screen, rays of its reflected or shadowed ambient light allow it to be sensed.

U.S. Pat. No. 4,868,551 discloses a touch screen that can detect a pointer near the surface of the display by detecting light reflected by the pointer (reflected or diffusive).

DISCLOSURE OF THE INVENTION

It is an object of the present invention to provide a touch sensitive screen which goes someway to overcoming the above mentioned disadvantages or which will at least provide the public with a useful choice.

Accordingly in a first aspect the invention may broadly be said to consist in a touch display comprising:

a screen for a user to touch and view an image on or through;

light sources at one or more edges of said screen, said light sources directing light across the surface of said screen;

at least two cameras having outputs, each said camera located at the periphery of said screen to image the space in front of said screen, said output including a scanned image;

means for processing said outputs to detect the level of light, said light including:
  direct light from said light sources, and/or
  reflected light from said light sources;

a processor receiving the processed outputs of said cameras, said processor employing triangulation techniques and said processed outputs to determine whether the processed outputs indicate the presence of an object proximate to said screen and if so the location of said object.

Preferably said processed output indicates the relative bearing of a presumed object location relative to said camera.

Preferably said processed output indicates the relative bearing of a presumed object location relative to the centre of the lens of said camera.

Preferably said processor determines location of said object as a planar screen co-ordinate.

Preferably said light sources are behind said screen arranged to project light through said screen and said display includes at each edge having a light source, light deflectors in front of said screen, directing light emitted from said light sources across the surface of said screen.

Preferably said cameras are line scan cameras, said camera output including information on line scanned and said processor using said information in determining location of said object.

Preferably said touch display including:

means for modulating said light from said light sources to provide a frequency band within the imageable range of said cameras;

means for excluding image data outside said frequency band.

Preferably said means for processing said outputs includes said means for excluding image data outside said frequency band and said means for excluding image data outside said frequency includes filtering.

Preferably said filtering includes applying a filter selected from the group consisting of:
  a comb filter;
  a high pass filter;
  a notch filter; and
  a band pass filter.

Preferably said touch display including
means for controlling said light sources; and
means for taking and processing an image taken in a non lighted ambient light state and in a lighted state; wherein said means for processing said outputs subtracts the ambient state from the lighted state before detecting the level of light.

Preferably said said light sources are LEDs and said touch display includes means for controlling the operation of sections of said light source independent of other sections of said light source.

Preferably means for controlling the operation of sections of said light source includes means for independently controlling the effective intensity of said light source.

Preferably said means for controlling sections of said light source comprises wiring said sections in antiphase and driving using a bridge drive.

Preferably means for controlling sections of said light source comprises using a diagonal bridge drive.

Preferably said means for controlling sections of said light source comprises using a shift register for each section to be controlled.

Preferably said means for taking and processing images includes controlling sections of said light sources and each said camera and said means for processing said outputs includes processing information on whether a said section is lighted or not.

Preferably some section are lighted and others are not when an image is taken.

Accordingly in a second aspect the invention may broadly be said to consist in a touch display comprising:

a screen for a user to touch and view an image on or through;

light sources at one or more edges edge of said screen, said light sources directing light across the surface of said screen;

at least two cameras having outputs located at the periphery of said screen, said cameras located so as not to receive direct light from said light sources, each said camera imaging the space in front of said screen, said output including a scanned image;

means for processing said outputs to detect level of reflected light; and a processor receiving the processed outputs of said cameras, said processor employing triangulation techniques and said processed outputs to determine whether the processed outputs indicate the presence of an object proximate to said screen and if so the location of said object.

Preferably said processed output indicates the relative bearing of a presumed object location relative to said camera.

Preferably said processed output indicates the relative bearing of a presumed object location relative to the centre of the lens of said camera.

Preferably said processor determines location of said object as a planar screen co-ordinate.

Preferably said touch display including:

means for modulating said light from said light sources to provide a frequency band within the imageable range of said cameras;

means for excluding image data outside said frequency band.

Preferably said means for processing said outputs includes said means for excluding image data outside said frequency band and said means for excluding image data outside said frequency includes filtering.

Preferably filtering includes applying a filter selected from the group consisting of:
  a comb filter;
  a high pass filter;
  a notch filter; and
  a band pass filter.

Preferably said touch display including:

means for controlling said light sources; and means for taking and processing an image taken in a non lighted ambient light state and in a lighted state;

wherein said means for processing said outputs subtracts the ambient state from the lighted state before detecting the level of light.

Preferably said light sources are LEDs and said touch display includes means for controlling the operation of sections of said light source independent of other sections of said light source.

Preferably means for controlling the operation of sections of said light source includes means for independently controlling the effective intensity of said light source.

Preferably the means for controlling sections of said light source comprises wiring said sections in antiphase and driving using a bridge drive.

Preferably the means for controlling sections of said light source comprises using a diagonal bridge drive.

Preferably the means for controlling sections of said light source comprises using a shift register for each section to be controlled.

Preferably said means for taking and processing images includes controlling sections of said light sources and each said camera and said means for processing said outputs includes processing information on whether a said section is lighted or not.

Preferably some sections are lighted and others are not when an image is taken.

Preferably said screen is reflective, said camera further images said screen, and said means for processing outputs detects the level of light from the mirror image.

Preferably said processed out put indicates the relative bearing of a presumed object relative to said camera and the distance of said object from said screen.

Accordingly in a third aspect the invention may broadly be said to consist in a method of receiving user inputs in reference to an image including the steps of:

providing a screen for a user to touch and view an image on or through;

providing light sources at one or more edges of said screen, said light sources directing light across the surface of said screen;

providing at least two cameras having outputs, each said camera located at the periphery of said screen to image the space in front of said screen, said output including a scanned image;

processing said outputs to detect the level of light, said light including:

direct light from said light sources, and/or reflected light from said light sources;

processing the processed outputs of said cameras, using triangulation techniques to obtain the location of said object.

Preferably said processed output indicates the relative bearing of a presumed object location relative to a said camera.

Preferably said processed output indicates the relative bearing of a presumed object location relative to the centre of the lens of said camera.

Preferably said location of is a planar screen co-ordinate.

Preferably said light sources are behind said screen and arranged to project light through said screen and said display includes at each edge having a light source, light deflectors in front of said screen, directing light emitted from said light sources across the surface of said screen.

Preferably said cameras are line scan cameras, said camera output including information on line scanned and said processor using said information in determining location of said object.

Preferably said method including the steps of:

modulating said light from said light sources to provide a frequency band within the imageable range of said cameras;

excluding image data outside said frequency band.

Preferably the step of processing said outputs includes the steps of excluding image data outside said frequency band and said step of excluding image data outside said frequency includes filtering.

Preferably filtering includes the step of applying a filter selected from the group consisting of:

a comb filter;

a high pass filter;

a notch filter; and a band pass filter.

Preferably said method including the steps of:

controlling said light sources; and taking and processing an image taken in a non lighted ambient light state and in a lighted state;

wherein said step of processing said outputs subtracts the ambient state from the lighted state before detecting the level of light.

Preferably said light sources are LEDs and said touch display includes means for controlling the operation of sections of said light source independent of other sections of said light source.

Preferably the step of controlling the operation of sections of said light source includes independently controlling the effective intensity of said light source.

Preferably the step of controlling sections of said light source comprises wiring said sections in antiphase and driving using a bridge drive.

Preferably the step of controlling sections of said light source comprises using a diagonal bridge drive.

Preferably the step of controlling sections of said light source comprises using a shift register for each section to be controlled.

Preferably the step of taking and processing images includes controlling sections of said light sources and each said camera and said step of processing said outputs includes processing information on whether a said section is lighted or not.

Preferably some sections are lighted and others are not when an image is taken.

Accordingly in a fourth aspect the invention may broadly be said to consist in a method of receiving user inputs in reference to an image including the steps of:

providing a screen for a user to touch and view an image on or through;

providing light sources at one or more edges edge of said screen, said light sources directing light across the surface of said screen;

providing at least two cameras having outputs located at the periphery of said screen, said cameras located so as not to receive direct light from said light sources, each said camera imaging the space in front of said screen, said output including a scanned image;

processing said outputs to detect level of reflected light; and processing the processed outputs of said cameras, employing triangulation techniques and said processed outputs to determine whether the processed outputs indicate the presence of an object proximate to said screen and if so the location of said object.

Preferably said processed output indicates the relative bearing of a presumed object location relative to said camera.

Preferably said processed output indicates the relative bearing of a presumed object location relative to the centre of the lens of said camera.

Preferably said processor determines location of said object as a planar screen co-ordinate.

Preferably said method including:

means for modulating said light from said light sources to provide a frequency band within the imageable range of said cameras;

means for excluding image data outside said frequency band.

Preferably said means for processing said outputs includes said means for excluding image data outside said frequency band and said means for excluding image data outside said frequency includes filtering.

Preferably filtering includes applying a filter selected from the group consisting of:

a comb filter;
a high pass filter;
a notch filter; and
a band pass filter.

Preferably said method including means for controlling said light sources; and means for taking and processing an image taken in a non lighted ambient light state and in a lighted state;

wherein said means for processing said outputs subtracts the ambient state from the lighted state before detecting the level of light.

Preferably said light sources are LEDs and said touch display includes means for controlling the operation of sections of said light source independent of other sections of said light source.

Preferably the means for controlling the operation of sections of said light source includes means for independently controlling the effective intensity of said light source.

Preferably the means for controlling sections of said light source comprises wiring said sections in antiphase and driving using a bridge drive.

Preferably the means for controlling sections of said light source comprises using a diagonal bridge drive.

Preferably the means for controlling sections of said light source comprises using a shift register for each section to be controlled.

Preferably said means for taking and processing images includes controlling sections of said light sources and each said camera and said means for processing said outputs includes processing information on whether a said section is lighted or not.

Preferably some sections are lighted and others are not when an image is taken.

Preferably said screen is reflective, said camera further images said screen, and said means for processing outputs detects the level of light from the mirror image.

Preferably said processed out put indicates the relative bearing of a presumed object relative to said camera and the distance of said object from said screen.

Accordingly in a fifth aspect the invention may broadly be said to consist in a method of receiving user inputs in reference to an image:

providing at least one light sources on or adjacent the periphery of said image, said light sources directing light across said image;

detecting at at least two locations on or adjacent the periphery of said image, the level of light and providing said level as an output;

processing said outputs using triangulation techniques to determine whether said outputs indicate the presence of an object proximate to said image and if so the location of said object.

Preferably said locations are substantially non-opposite so that when an object is present said output is substantially indicative of light reflected from said object.

Accordingly in a sixth aspect the invention may broadly be said to consist in a user input device for locating an object with reference to an image comprising:

at least one light source at or proximate to the periphery of said image, said light source directing light across said image;

at one detector having an output, said detector located or in proximity to said image to image the space in front of said screen, said output indicative of a level of light;

a processor receiving said outputs and using triangulation techniques and said outputs determining the presence of said object and if so the location of said object.

BRIEF DESCRIPTION OF THE DRAWINGS

One preferred form of the present invention will now be described with reference to the accompanying drawings in which.

BEST MODE FOR CARRYING OUT THE INVENTION

The present invention relates to improvements in signal processing in the field of optical imaging touch screens. In the preferred embodiment the optical touch screen uses front illumination and is comprised of a screen, a series of light sources, and at least two area scan cameras located in the same plane and at the periphery of the screen. In another embodiment, the optical touch screen uses backlight illumination; the screen is surrounded by an array of light sources located behind the touch panel which are redirected across the surface of the touch panel. At least two line scan cameras are used in the same plane as the touch screen panel. The signal processing improvements created by these implementations are that an object can be sensed when in close proximity to the surface of the touch screen, calibration is simple, and the sensing of an object is not effected by the changing ambient light conditions, for example moving lights or shadows.

Figure 3:
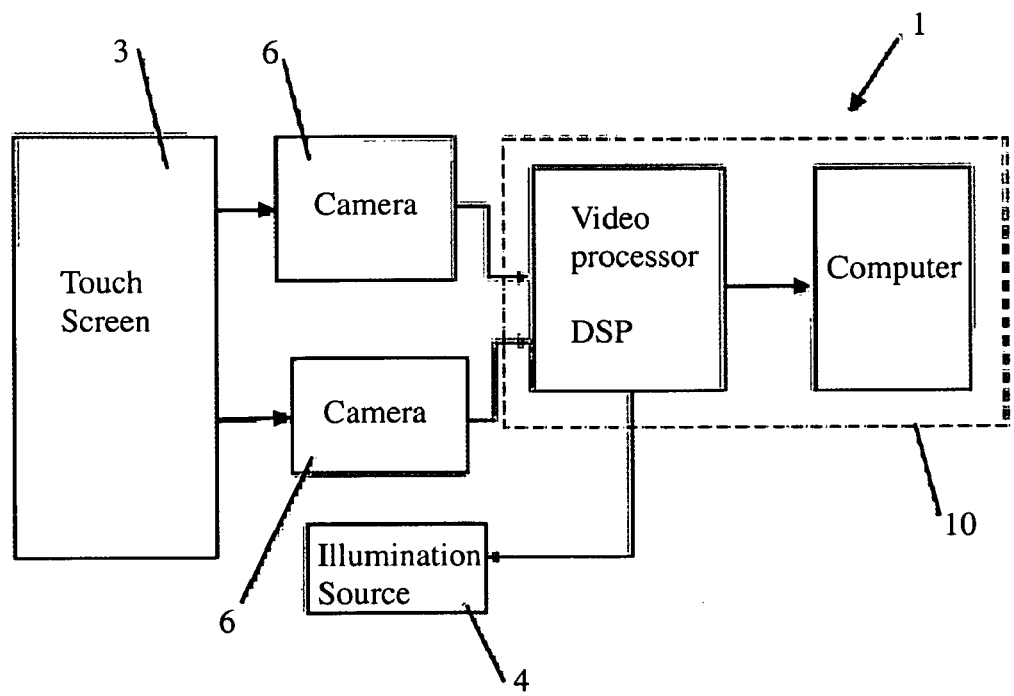
FIG. 3 is a block diagram of the system of the preferred embodiment of the touch screen of the present invention.

A block diagram of a general touch screen system 1 is shown in FIG. 3. Information flows from the cameras 6 to the video processing unit and computer, together referred to as the processing module 10. The processing module 10 performs many types of calculations including filtering, data sampling, and triangulation and controls the modulation of the illumination source 4.

Front Illumination Touch Screen

Figure 1:
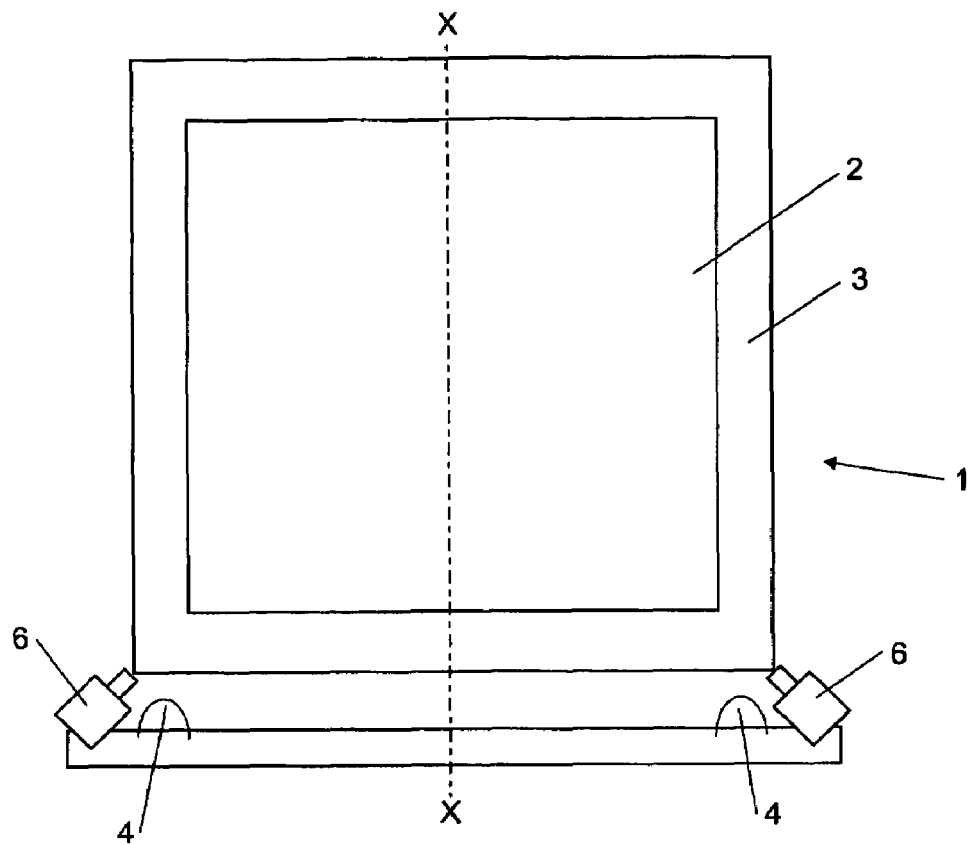
FIG. 1 is a diagrammatic illustration of a front view of the preferred embodiment of the touch screen of the present invention.

The preferred embodiment of the touch screen of the present invention is shown in FIG. 1. The touch screen system 1 is comprised of a monitor 2, a touch screen panel 3, at least two lights 4, a processing module (not shown) and at least two area scan cameras 6. The monitor 2, which displays information to the user, is positioned behind the touch screen panel 3. Below the touch screen panel 3 and the monitor 2 are the area scan cameras 6 and light sources 4. The light sources 4 are preferably Light Emitting Diodes (LED) but may be another type of light source, for example, a fluorescent tube. LEDs are ideally used as they may be modulated as required, they do not have an inherent switching frequency. The cameras 6 and LEDs 4 are in the same plane as the touch panel 3.

Figure 1A:
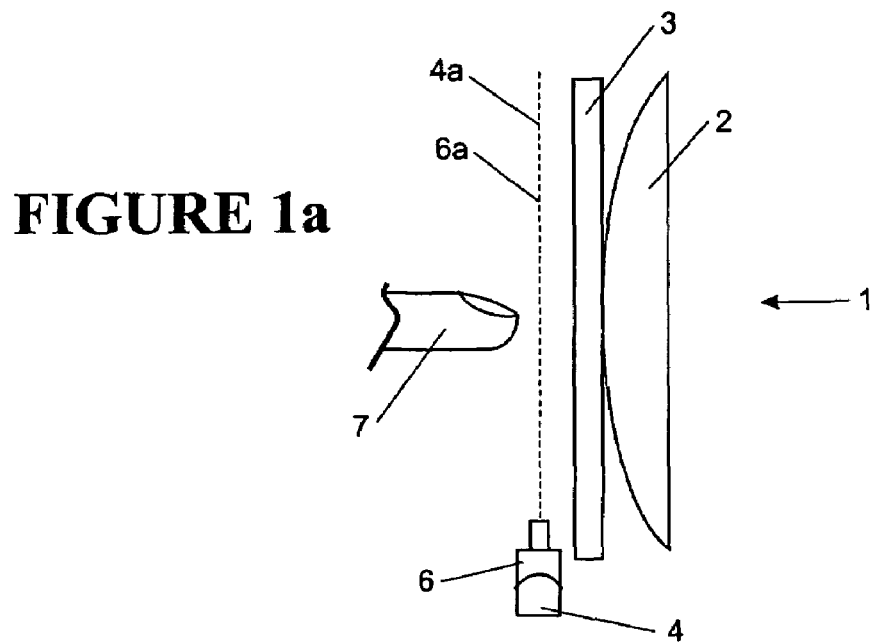
FIG. 1a is an illustration of a cross sectional view through X-X of FIG. 1.
Figure 1B:
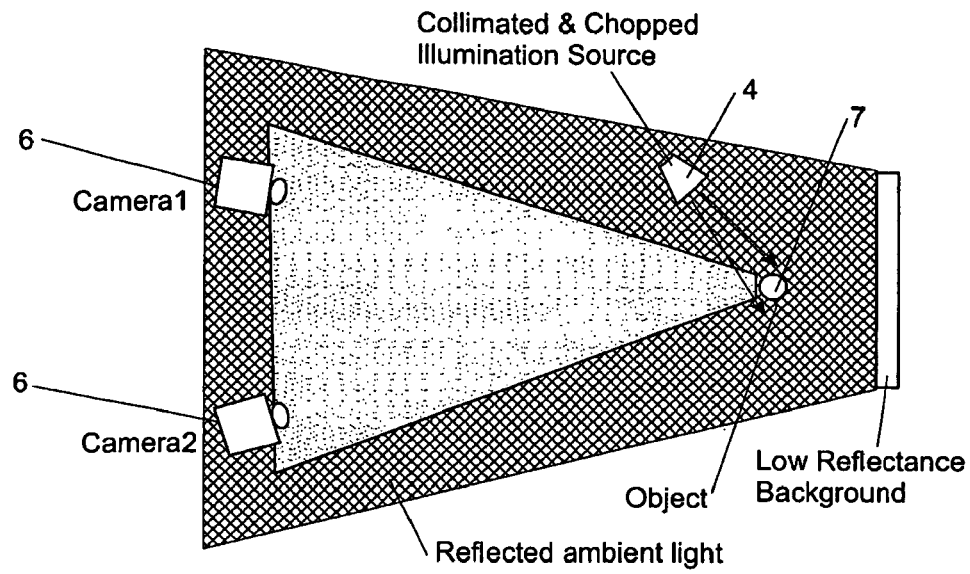
FIG. 1b is an illustration of front illumination of the preferred embodiment of the touch screen of the present invention.

Referring to FIG. 1a, the viewing field 6a of the area scan camera 6 and the radiation path 4a of the LEDs 4 are in the same plane and parallel to the touch panel 3. When an object 7, shown as a finger, enters into the radiation path 4a, it is illuminated. This is typically known as front panel illumination or object illumination. In FIG. 1b, this principle is again illustrated. Once a finger 7 enters into the radiation field 4a, a signal is reflected back to the camera 6. This indicates that a finger 7 is near to or touching the touch panel 3. In order to determine if the finger 7 is actually touching the touch panel 3, the location of the touch panel 3 must be established. This is performed using another signal, a mirrored signal.

Mirrored Signal

The mirrored signal occurs when the object 7 nears the touch panel 3. The touch panel 3 is preferably made from glass which has reflective properties. As shown in FIG. 2, the finger 7 is positioned at a distance 8 above the touch panel 3 and is mirrored 7a in the touch panel 3. The camera 6 (only shown as the camera lens) images both the finger 7 and the reflected image 7a. The image of finger 7 is reflected 7a in panel 3; this can be seen through the field lines 6b, 6c and virtual field line 6d. This allows the camera 6 to image the reflected 7a image of the finger 7. The data produced from the camera 6 corresponds to the position of the field lines 6e, 6b as they enter the camera 6. This data is then fed into a processing module 10 for analysis.

Figure 2A:
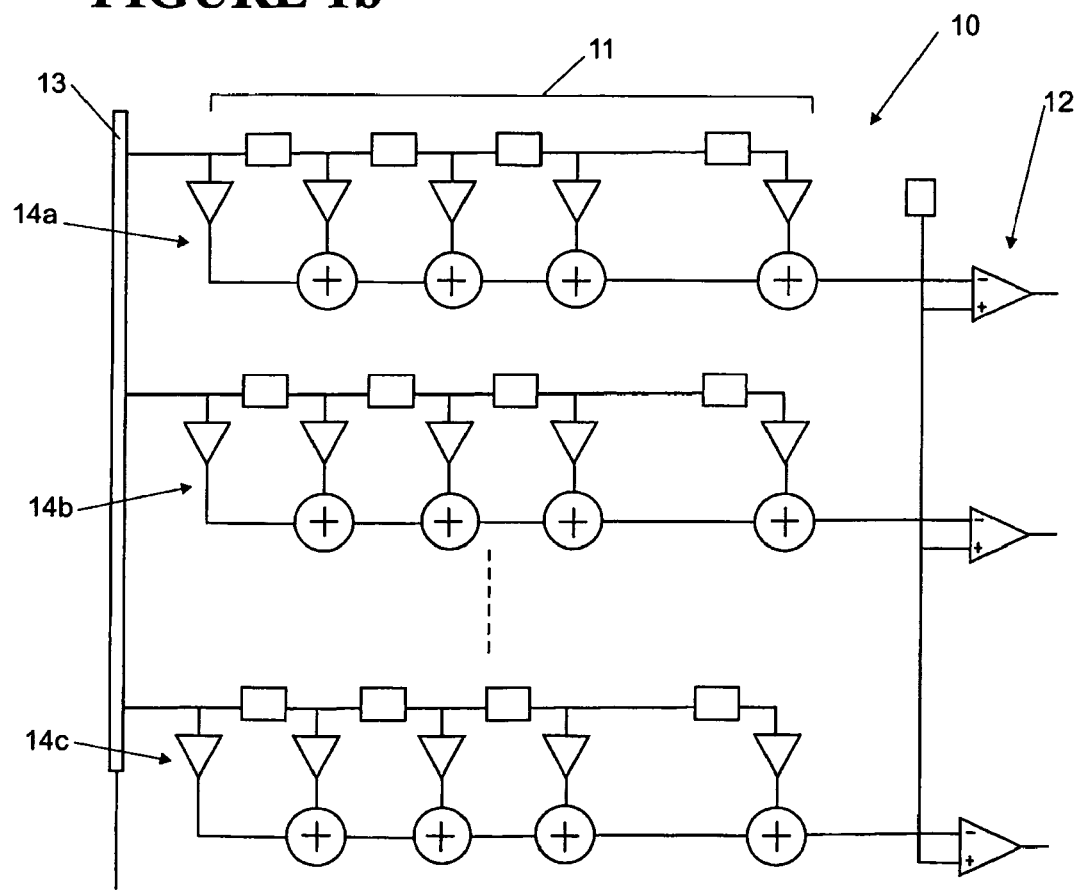
FIG. 2a is a block diagram of the filter implementation of the preferred embodiment of the touch screen of the present invention.
Figure 2:
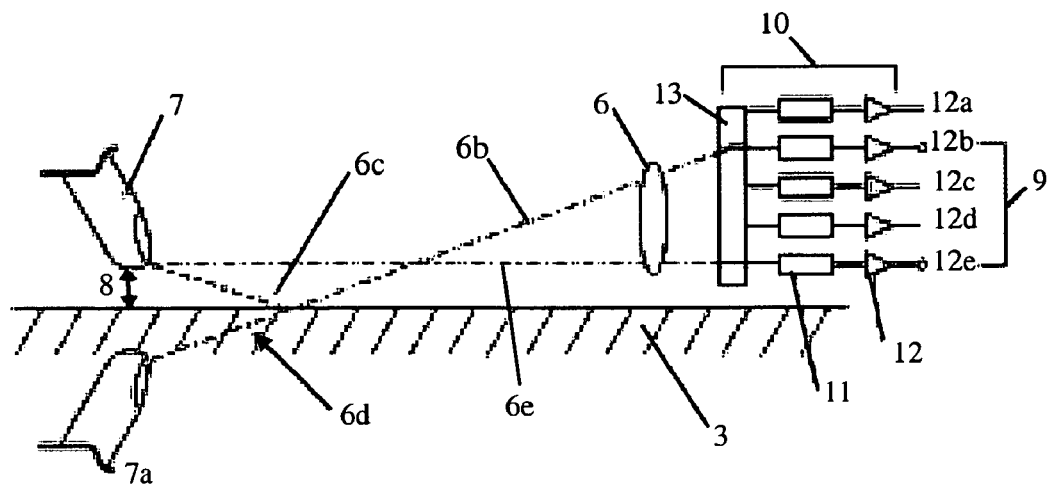
FIG. 2 is an illustration of the mirroring effect in the preferred embodiment of the touch screen of the present invention.
Figure 2B:
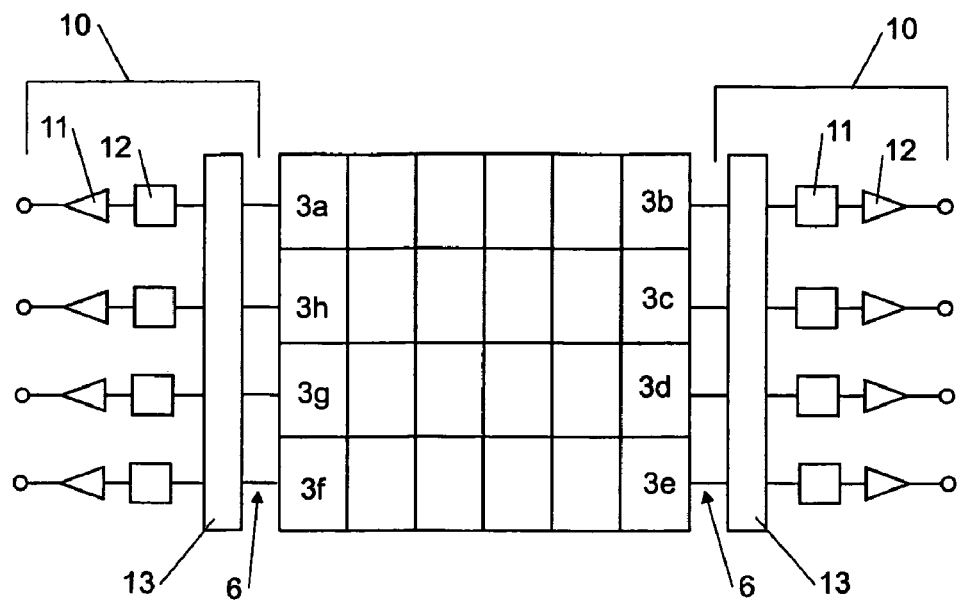
FIG. 2b is a diagrammatic illustration of the pixels seen by an area camera and transmitted to the processing module in the preferred embodiment of the present invention.

A section of the processing module 10 is shown in FIG. 2a. Within the processing module 10 is a series of scanning imagers 13 and digital filters 11 and comparators 12 implemented in software. There are a set number of pixels on the touch panel, for example 30,000 pixels. These may be divided up into 100 columns of 300 pixels. The number of pixels may be more or less than the numbers used, the numbers are used for example only. In this situation, there are 30,000 digital filters 11 and comparators 12, broken up into 100 columns of 300 pixels, this forms a matrix similar to the matrix of pixels on the monitor 2. A representation of this is shown in FIG. 2a as one column is serviced by one image scanner 13 and three sets 14a, 14b, 14c of digital filters 11 and comparators 12, this allows information from three pixels to be read. A more illustrated example of this matrix is shown in FIG. 2b. Eight pixels 3a-3h are connected, in groups of columns, to an image scanner 13 that is subsequently connected to a filter 11 and a comparator 12 (as part of the processing module 10). The numbers used in FIG. 2b are used for illustration only; an accurate number of pixels could be greater or less in number. The pixels shown in this diagram may not form this shape in the panel 3, their shape will be dictated by the position and type of camera 6 used.

Referring back to FIG. 2, finger 7 and mirrored finger 7a activates at least two pixels; two pixels are used for simplicity. This is shown by the field lines 6e and 6b entering the processing module 10. This activates the software so the two signals pass through a digital filter 11 and a comparator 12 and results in a digital signal output 12a-12e. The comparator 12 compares the output from the filter 11 to a predetermined threshold value. If there is a finger 7 detected at the pixel in question, the output will be high, otherwise it will be low.

The mirrored signal also provides information about the position of the finger 7 in relation to the cameras 6. It can determine the height 8 of the finger 7 above the panel 3 and its angular position. The information gathered from the mirrored signal is enough to determine where the finger 7 is in relation to the panel 3 without the finger 7 having to touch the panel 3.

Figure 4:
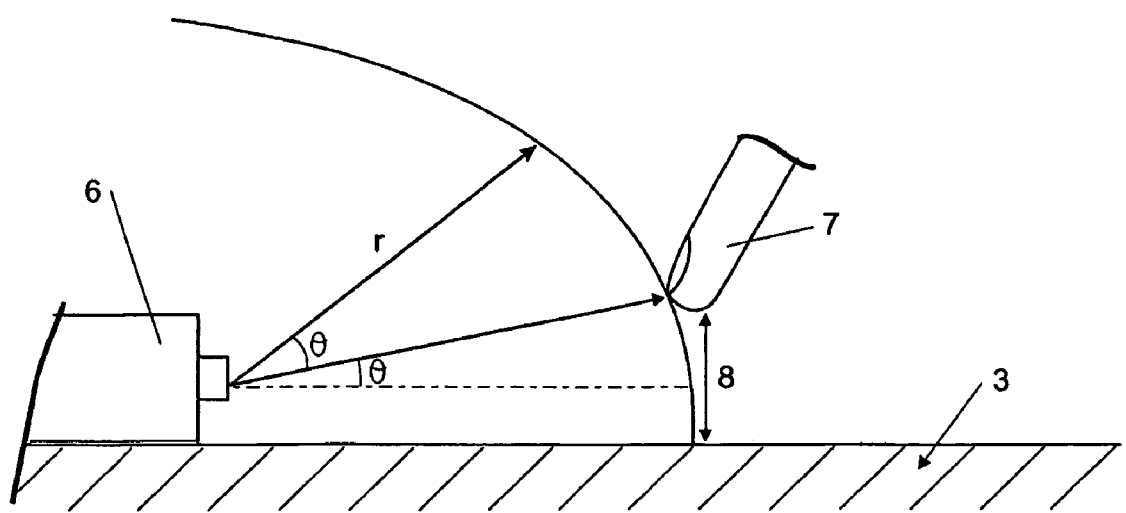
FIG. 4 is a side view of the determination of the position of an object using the mirrored signal in the preferred embodiment of the touch screen of the present invention.
Figure 4A:
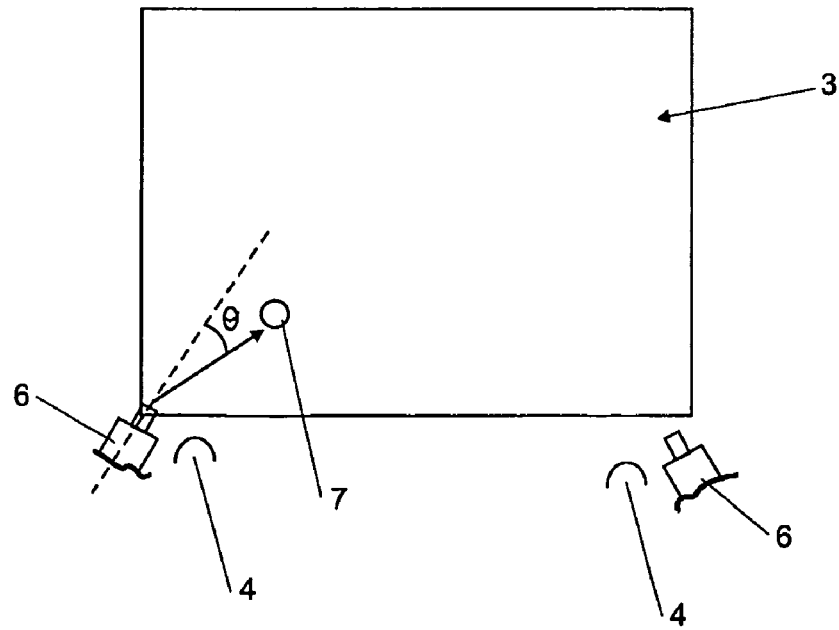
FIG. 4a is top view of the determination of the position of an object using the mirrored signal in the preferred embodiment of the touch screen of the present invention.

FIGS. 4 and 4a show the positional information that is able to be obtained from the processing of the mirrored signal. The positional information is given in polar co-ordinates. The positional information relates to the height of the finger 7, and the position of the finger 7 over the panel 3.

Referring again to FIG. 2, the height that the finger 7 is above the panel 3 can be seen in the distance between the outputs 12a-12e. In this example the finger 7 is a height 8 above the panel 3 and the outputs 12b and 12e are producing a high signal. The other outputs 12*a*, 12*d* are producing a low signal. It has been found that the distance 9 between the high outputs 12*b*, 12*e* is twice as great as the actual height 8 of the finger above the panel 3.

Modulating

The processing module 10 modulates and collimates the LEDs 4 and sets a sampling rate. The LEDs 4 are modulated, in the simplest embodiment the LEDs 4 are switched on and off at a predetermined frequency. Other types of modulation are possible, for example modulation with a sine wave. Modulating the LEDs 4 at a high frequency results in a frequency reading (when the finger 7 is sensed) that is significantly greater than any other frequencies produced by changing lights and shadows. The modulation frequency is greater than 500 Hz but no more than 10 kHz.

Sampling

The cameras 6 continuously generate an output, which due to data and time constraints is periodically sampled by the processing module 10. In the preferred embodiment, the sampling rate is at least two times the modulation frequency; this is used to avoid aliasing. The modulation of the LEDs and the sampling frequency does not need to be synchronised.

Filtering

Figure 6:
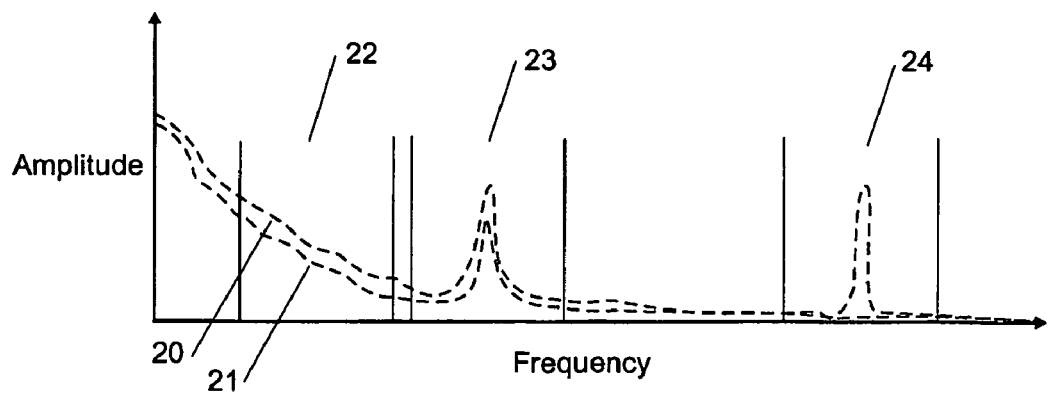
FIG. 6 is a graph representing in the frequency domain the output from the imager in the processing module in the preferred embodiment of the touch screen of the present invention.

The output in the frequency domain from the scanning imager 13 is shown in FIG. 6. In FIG. 6, there are two typical graphs, one showing when there is no object being sensed 21 and one showing when a finger is sensed 20. In both graphs there is a region of movement of shadows 22 at approximately 5 to 20 Hz, and an AC mains frequency region 23 at approximately 50 to 60 Hz.

In the preferred embodiment when there is not object in the field view, no signal is transmitted to the area camera so there are no other peaks in the output. When an object is in the field of view, there is a signal 24 corresponding to the LED modulated frequency, for example 500 Hz. The lower unwanted frequencies 22, 23 can be removed by various forms of filters. Types of filters can include comb, high pass, notch, and band pass filters.

Figure 6A:
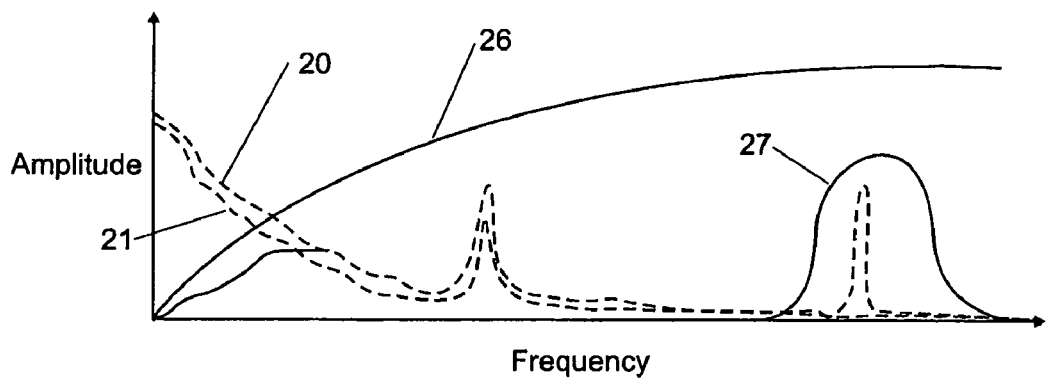
FIG. 6a is a graph representing in the frequency domain the filters responses on the signal from the imager in the preferred embodiment of the touch screen of the present invention.
Figure 6B:
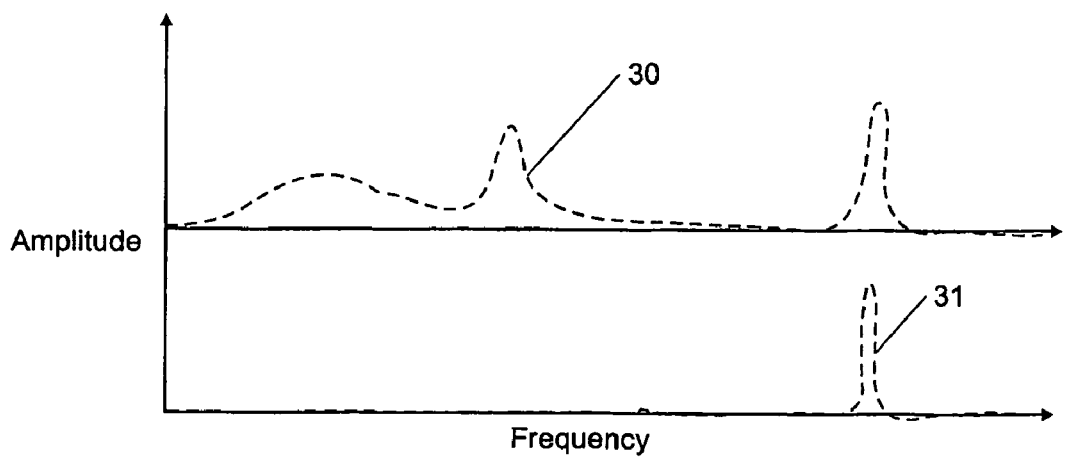
FIG. 6b is a graph representing in the frequency domain the separation of the object from the background after two types of filtering in the preferred embodiment of the touch screen of the present invention.

In FIG. 6*a* the output from the image scanner is shown with a couple of different filter responses 26, 27 being applied to the signal 20. In a simple implementation a 500 Hz comb filter 26 may be implemented (if using a 500 Hz modulation frequency). This will remove only the lowest frequencies. A more advanced implementation would involve using a band pass 27 or notch filter. In this situation, all the data, except the region where the desired frequency is expected, is removed. In FIG. 6*a* this is shown as a 500 Hz narrow band filter 27 applied to the signal 20 with a modulation frequency of 500 Hz. These outputs 30, 31 from the filters 26, 27 are further shown in FIG. 6*b*. The top graph shows the output 30 if a comb filter 26 is used while the bottom graph shows the output 31 when a band filter 27 is used. The band filter 27 removes all unwanted signals while leaving the area of interest.

Once the signal has been filtered and the signal in the area of interest identified, the resulting signal is passed to the comparators to be converted into a digital signal and triangulation is performed to determine the actual position of the object. Triangulation is known in the prior art and disclosed in U.S. Pat. No. 5,534,917 and U.S. Pat. No. 4,782,328, and are herein incorporated by reference.

Calibration

Figure 5:
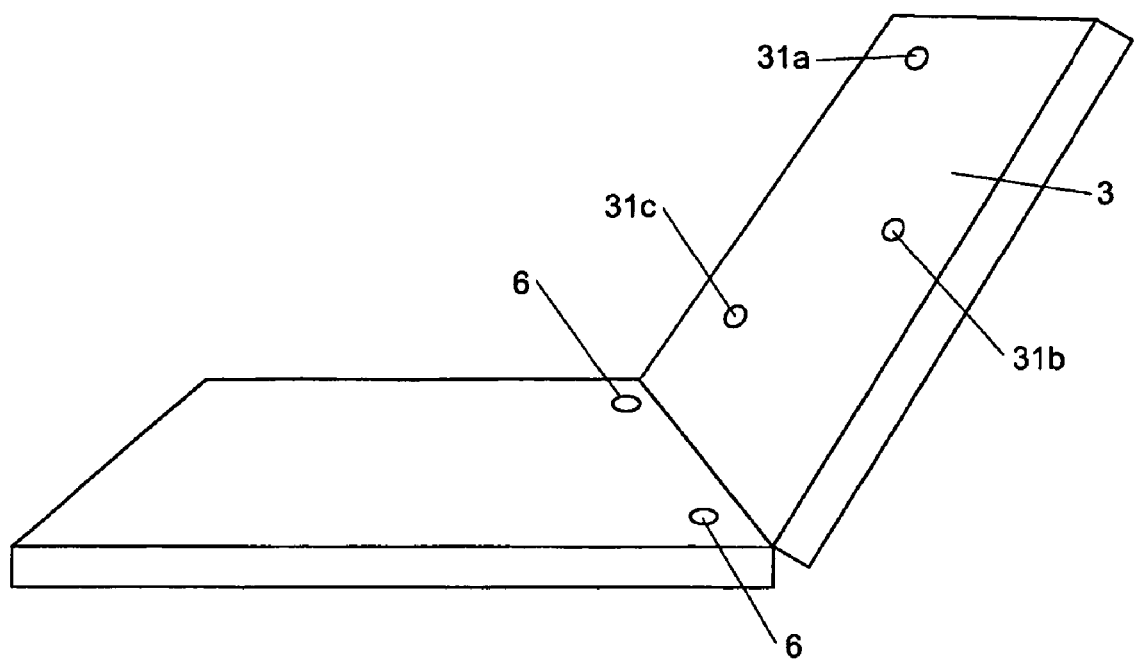
FIG. 5 is an illustration of the calibration in the preferred embodiment of the touch screen of the present invention.

The preferred embodiment of the touch screen of the present invention uses very quick and easy calibration that allows the touch screen to be used in any situation and moved to new locations, for example the touch screen is manufactured as a lap top. Calibration involves touching the panel 3 in three different locations 31*a*, 31*b*, 31*c*, as shown in FIG. 5; this defines the touch plane of the touch panel 3. These three touch points 31*a*, 31*b*, 31*c* provide enough information to the processing module (not shown) to calculate the position and size of the touch plane in relation to the touch panel 3. Each touch point 31*a*, 31*b*, 31*c* uses both mirrored and direct signals, as previously described, to generate the required data. These touch points 31*a*, 31*b*, 31*c* may vary around the panel 3, they need not be the actual locations shown.

Back Illumination Touch Screen

Figure 7D:
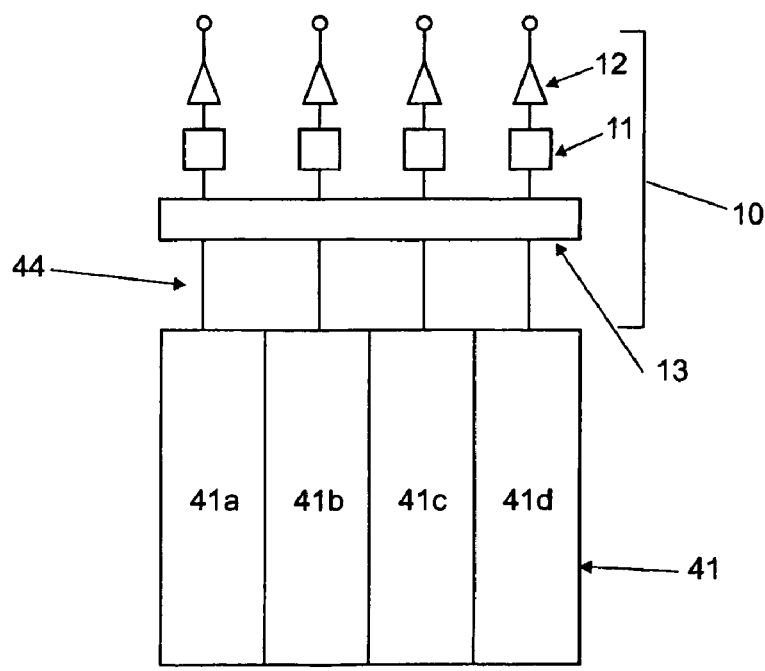
FIG. 7d is a diagrammatic illustration of the pixels seen by a line scan camera and transmitted to the processing module in the alternate embodiment of the present invention.
Figure 7:
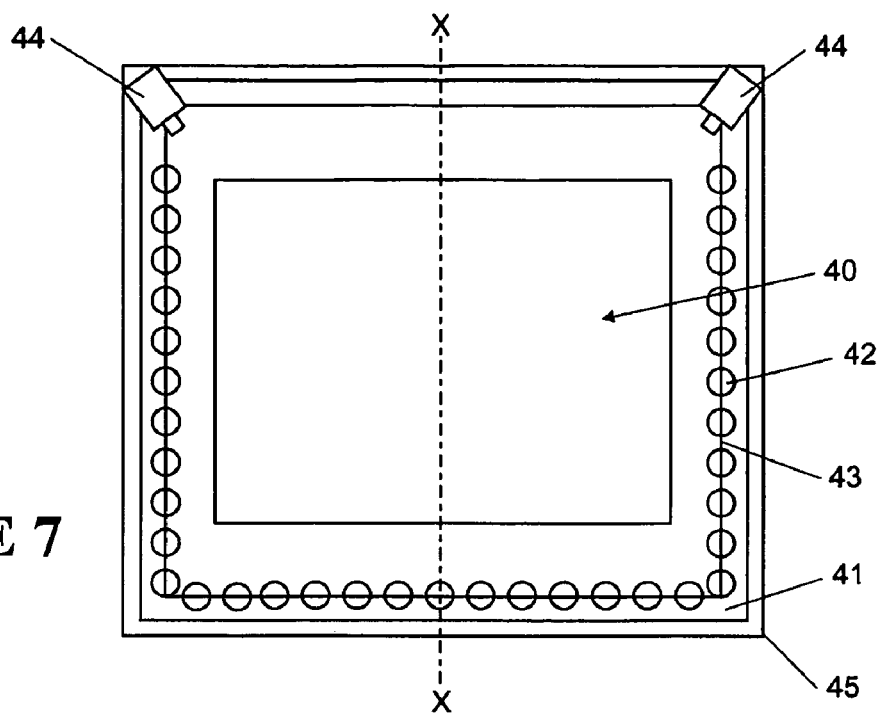
FIG. 7 is an illustration of a front view of the alternate embodiment of the touch screen of the present invention.

FIG. 7 shows the alternate embodiment of the touch screen of the present invention. As in the preferred embodiment, the monitor 40 is behind the touch panel 41 and around the sides and the lower edge of the panel 41 is an array of lights 42. These point outwards towards the user and are redirected across the panel 41 by a diffusing plate 43. The array of lights 42 consists of numerous Light Emitting Diodes (LEDs). The diffusing plates 43 are used redirect and diffuse the light emitted from the LEDs 42 across the panel 41. At least two line-scan cameras 44 are placed in the upper two corners of the panel 3 and are able to image an object. The cameras 44 can be alternately placed at any position around the periphery of the panel 41. Around the periphery of the touch panel 41 is a bezel 45 or enclosure. The bezel 45 acts as a frame that stops the light radiation from being transmitted to the external environment. The bezel 45 reflects the light rays into the cameras 44 so a light signal is always read into the camera 44 when there is no object near the touch panel 41.

Alternately, the array of lights 42 may be replaced with cold cathode tubes. When using a cold cathode tube, a diffusing plate 43 is not necessary as the outer tube of the cathode tube diffuses the light. The cold cathode tube runs along the entire length of one side of the panel 41. This provides a substantially even light intensity across the surface of the panel 41. Cold cathode tubes are not preferably used as they are difficult and expensive to modify to suit the specific length of each side of the panel 41. Using LED's allows greater flexibility in the size and shape of the panel 41.

Figure 7A:
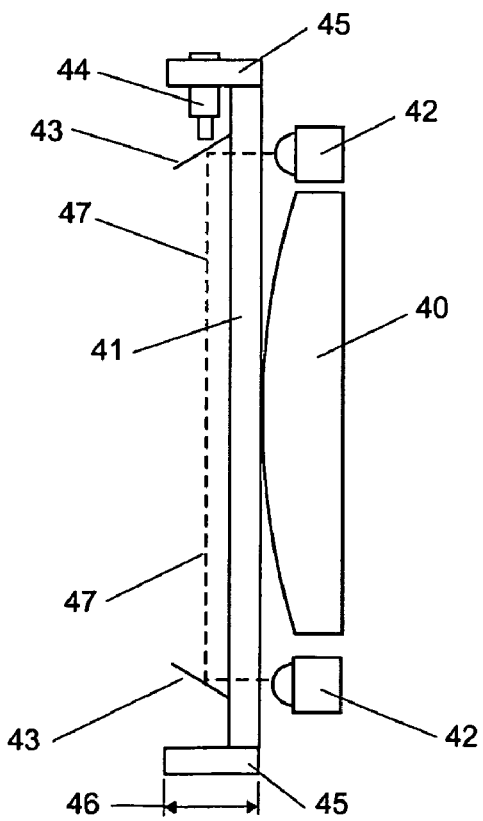
FIG. 7a is an illustration of a cross sectional view through X-X of the alternate embodiment of the touch screen of the present invention.

The diffusing plate 43 is used when the array of lights 42 consists of numerous LED's. The plate 43 is used to diffuse the light emitted from an LED and redirect it across the surface of panel 41. As shown in FIG. 7*a*, the light 47 from the LEDs 42 begins its path at right angles to the panel 41. Once it hits the diffusing plate 43, it is redirected parallel to the panel 41. The light 47 travels slightly above the surface of the panel 41 so to illuminate the panel 41. The light 47 is collimated and modulated by the processing module (not shown) as previously described.

Referring to FIG. 7*a*, increasing the width 46 of the bezel 45 can be increased or decreased. Increasing the width 46 of the bezel 45 increases the distance at which an object can be sensed. Similarly, the opposite applies to decreasing the width 10 of the bezel 45 The line scan cameras 44 consists of a CCD element, lens and driver control circuitry. When an image is seen by the cameras 44 a corresponding output signal is generated.

Figure 7B:
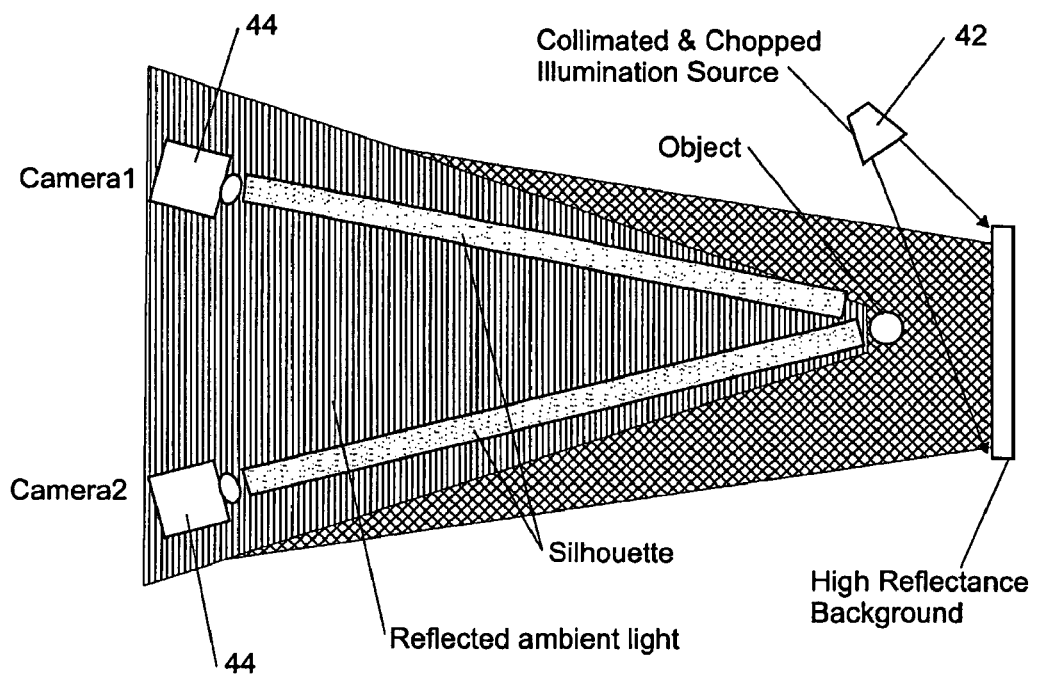
FIG. 7b is an illustration of rear illumination of the alternate embodiment of the touch screen of the present invention.
Figure 7C:
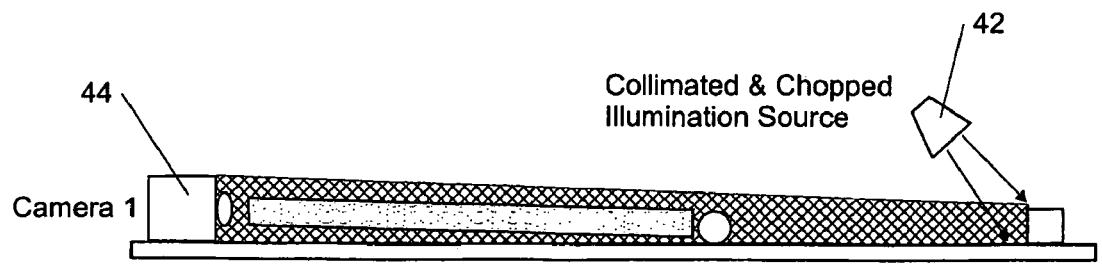
FIG. 7c is an illustration of rear illumination controlling the sense height of the alternate embodiment of the present invention.

Referring to FIGS. 7*b* and 7*c*, when the touch screen is not being used, i.e. when there is no user interaction or input, all the light emitted from the array of lights 42 is transmitted to the line-scan cameras 44. When there is user input, i.e. a user selects something on the screen by touching it with their finger; a section of the light being transmitted to the camera 44 is interrupted. Through calculations utilising triangulation algorithms with the outputted data from the camera 44, the location of the activation can be determined.

The line scan cameras 44 can read two light variables, namely direct light transmitted from the LED's 42 and reflected light. The method of sensing and reading direct and mirrored light is similar to what has been previously described, but is simpler as line scan cameras can only read one column from the panel at once; it is not broken up into a matrix as when using an area scan camera. This is shown in FIG. 7d where the panel 41 is broken up into sections 14a-14d (what the line scan camera can see). The rest of the process has been described previously. The pixels shown in this diagram may not form this shape in the panel 41, their shape will be dictated by the position and type of camera 44 used.

In the alternate embodiment, since the bezel surrounds the touch panel, the line scan cameras will be continuously reading the modulated light transmitted from the LEDs. This will result in the modulated frequency being present in the output whenever there is no object to interrupt the light path. When an object interrupts the light path, the modulated frequency in the output will not be present. This indicates that an object is in near to or touching the touch panel. The frequency present in the output signal is twice the height (twice the amplitude) than the frequency in the preferred embodiment. This is due to both signals (direct and mirrored) being present at once.

Figure 8:
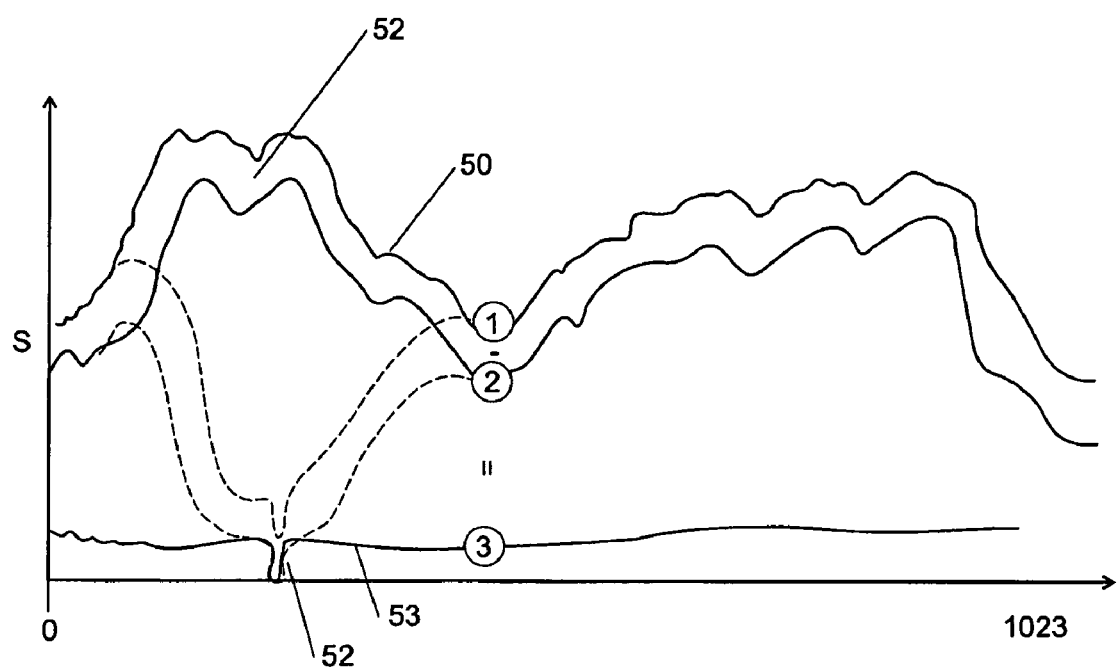
FIG. 8 is a graph representing simple separation of an object from the background in the alternate embodiment of the present invention.

In a further alternate embodiment, shown in FIG. 8, the output from the camera is sampled when the LEDs are modulating on and off. This provides a reading of ambient light plus backlight 50 and a reading of ambient light alone 51. When an object interrupts the light from the LEDs, there is a dip 52 in the output 50. As ambient light varies a lot, it is difficult to see this small dip 52. For this reason, the ambient reading 51 is subtracted from the ambient and backlight reading 50. This results in an output 54 where the dip 52 can be seen and thus simple thresholding can be used to identify the dip 52.

Calibration of this alternate embodiment is performed in the same manner as previously described but the touch points 31a, 31b, 31c (referring to FIG. 5) cannot be in the same line, they must be spread about the surface of the panel 3.

In FIG. 7 the backlight is broken up into a number of individual sections, 42a to 42f. One section or a subset of sections is activated at any time. Each of these sections is imaged by a subset of the pixels of the image sensors 44. Compared to a system with a single backlight control, the backlight emitters are operated at higher current for shorter periods. As the average power of the emitter is limited, the peak brightness is increased. Increased peak brightness improves the ambient light performance.

The backlight switching may advantageously be arranged such that while one section is illuminated, the ambient light level of another section is being measured by the signal processor. By simultaneously measuring ambient and backlit sections, speed is improved over single backlight systems.

The backlight brightness is adaptively adjusted by controlling LED current or pulse duration, as each section is activated so as to use the minimum average power whilst maintaining a constant signal to noise plus ambient ratio for the pixels that view that section.

Control of the plurality of sections with a minimum number of control lines is achieved in one of several ways.

In a first implementation of a two section backlight, two groups of diodes can be wired antiphase and driven with a bridge drive.

In a second implementation with more than two sections, a diagonal bridge drive is used. For example, 4 wires are able to select 1 of 12 sections, 5 wires can drive 20 sections, and 6 wires can drive 30 sections.

In a third implementation, for a large number of sections, a shift register is physically distributed around the backlight, and only two control lines are required.

X-Y multiplexing arrangements are well known in the art. For example, 8+4 wires are used to control a 4 digit display with 32 LED's. For example, a 4 wire diagonal multiplexing arrangement can have 12 LEDs. Control lines are driven by tristate outputs such as are commonly found at the pins of microprocessors such as the Microchip PIC family. Each tristate output has two electronic switches which are commonly mosfets. Either or neither of the switches can be turned on. To operate each LED only two switches must be enabled. This arrangement can be used with any number of control lines, but is particularly advantageous for the cases of where certain leds can be controlled whilst the printed circuit board tracking remains simple. Where higher control numbers are used, it may be advantageous to use degenerate forms where some of the possible leds are omitted to ease the practical interconnection difficulties.

The diagonal multiplexing system has the following features:
  it is advantageous where there are 4 or more control lines
  it requires tri-state push-pull drivers on each control line
  rather than using an x-y arrangement of control lines with led's at the crossings, the arrangement is represented by a ring of control lines with a pair of antiphase LED's arranged on each of the diagonals between the control lines. Each LED can be uniquely selected, and certain combinations can also be selected.
  uses the minimum possible number of wires
  where emc filtering is needed on the wires there is a significant saving in components To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention claimed is:

1. A touch detection method comprising:
  directing light from a plurality of sources across a surface of a screen, the screen configured for a user to touch and view an image on or through;
  imaging (i) light traveling in a space above the front surface of said screen and (ii) a mirror image comprising light reflected from the surface of said screen using at least two cameras located so as not to receive direct light from the plurality of sources;
  processing outputs of said cameras to detect the level of reflected light from an object in the space above the front surface of said screen and the level of light from said mirror image; and
  determining a location of said object from the processed outputs of said cameras based on triangulation techniques.

2. A touch detection method as set forth in claim 1, wherein:
  the location comprises a relative bearing of the object relative to at least one camera and an indication of a distance of said object from said screen, the distance determined based on the light from the mirror image.

3. A touch detection method as set forth in claim 2, wherein the bearing is relative to the centre of the lens of at least one camera.

4. A touch detection method as set forth in claim 1, wherein determining a location of said object comprises determining that said object has touched said screen when said object and a reflection of said object coincide.

5. A touch detection method as set forth in claim 1, wherein the location of said object comprises a planar screen co-ordinate.

6. A touch detection method as set forth in claim 1, wherein said cameras comprise area scan cameras, said camera output including information on area scanned and said processor using said information in determining the location of said object.

7. A touch detection method as set forth in claim 1, further comprising:
    modulating said light from said light sources to provide a frequency band within the imageable range of said cameras; and
    excluding image data outside said frequency band.

8. A touch detection method as set forth in claim 1, wherein excluding image data outside said frequency band comprises filtering.

9. A touch detection method as set forth in claim 8 wherein filtering includes applying a filter selected from the group consisting of:
    a comb filter;
    a high pass filter;
    a notch filter; and
    a band pass filter.

10. A touch detection method as set forth in claim 1, further comprising:
    taking and processing an image taken in a non lighted ambient light state and in a lighted state;
    wherein processing said outputs comprises subtracting the ambient state from the lighted state before detecting the level of light.

11. A touch detection system comprising:
    a screen configured for a user to touch and view an image on or through;
    a plurality of light sources at one or more edges of said screen and configured to direct light across the surface of said screen;
    at least two cameras having outputs, each camera located at the periphery of said screen and positioned to image light traveling in the space above the front of said screen and light reflected from said screen, the light reflected from said screen representing a mirror image of the space above the front of said screen; and
    at least one processor configured to employ triangulation techniques and said outputs to determine whether the processed outputs indicate the presence of an object proximate to said screen and, if so, the location of said object;
    wherein the location comprises the distance of said object from the front of said screen.

12. The touch detection system set forth in claim 11, wherein the at least one processor is configured to determine the distance of said object from the front of the screen based on a mirror image of said object.

13. The touch detection system set forth in claim 11, wherein the at least one processor is configured to determine that an object has touched the screen when an image of the object and an image of the object's reflection coincide.

14. The touch detection system set forth in claim 11, wherein said location comprises the relative bearing of the object relative to at least one camera.

15. The touch detection system set forth in claim 14, wherein the relative bearing is measured relative to the centre of the lens of said camera.

16. The touch detection system set forth in claim 11, wherein the location comprises a location of said object as a planar screen co-ordinate.

17. The touch detection system set forth in claim 11, wherein:
    said plurality of light sources are positioned behind said screen and are arranged to project light through said screen;
    said display light deflectors in front of said screen at each edge having a light source; and
    said light deflectors are configured to direct light emitted from said light sources across the surface of said screen.

18. The touch detection system set forth in claim 11, wherein:
    said cameras comprise line scan cameras providing output including information on which line is scanned; and
    said at least one processor is configured to use said information on which line is scanned in determining the location of said object.

19. The touch detection system set forth in claim 11, further comprising a hardware or software filter configured to exclude image data outside a frequency band imageable by the cameras.

20. The touch detection system set forth in claim 19, wherein the filter comprises a filter selected from the group consisting of:
    a comb filter;
    a high pass filter;
    a notch filter; and
    a band pass filter.

21. The touch detection system set forth in claim 11, wherein the at least one processor is configured to:
    take and process at least one image in a non lighted ambient light state and at least one image in a lighted state; and
    in determining the location of said object, subtract the ambient state from the lighted state.

* * * * *

UNITED STATES PATENT AND TRADEMARK OFFICE
CERTIFICATE OF CORRECTION

PATENT NO. : 7,629,967 B2  Page 1 of 1
APPLICATION NO. : 11/033183
DATED : December 8, 2009
INVENTOR(S) : John David Newton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1262 days.

Signed and Sealed this

Second Day of November, 2010

David J. Kappos
*Director of the United States Patent and Trademark Office*